United States Patent Office 3,411,983
Patented Nov. 19, 1968

3,411,983
PROCESS FOR THE CONTROL OF SLIME-FORMING AND OTHER MICROORGANISMS WITH 2,3,6-TRICHLORO-5-NITROPHENYL COMPOUNDS
Theodore A. Girard, Wayne, N.J., assignor to Tenneco Chemicals, Inc., a corporation of Delaware
No Drawing. Filed Aug. 6, 1964, Ser. No. 387,980
12 Claims. (Cl. 162—161)

This invention relates to a process for inhibiting or preventing the growth of microorganisms in water systems. More particularly, it relates to a process for the control of slime-forming and other microorganisms in industrial systems involving water and substances that are normally susceptible to microbiological degradation in the presence of water.

Many industrial products, such as wood pulp, starch and protein material, animal hides, vegetable tanning liquors, and the like, when wet or subjected to treatment in water, are susceptible to degradation or deterioration resulting from the growth of bacteria and other microorganisms or from the action of enzymes produced by such growth. In other industrial applications where water is employed, such as cooling towers, water tanks, sewage disposal units, gravel filters, and the like, the growth of microorganisms may produce slime or other solid accumulations which may interfere with the proper functioning of equipment by decreasing the rate of flow of water and the rate of heat transfer.

Slime of the type encountered in industrial water systems consists of microorganisms, particularly bacteria, fungi, and algae, and accumulations of fibers and debris that are matted together to form masses and deposits that may be stringy, pasty, rubbery, gelatinous, mealy, hard, or horny. It may have acquired color and may have a characteristic odor.

Slime-forming microorganisms are contained in virtually all industrial waters. Of the many industrial processes where slime causes serious disadvantages, the paper-making process is faced with the slime problem in its most acute form. For this reason, the employment of the compounds of the present invention will be discussed with particular attention to pulp and paper manufacture. It should be understood, however, that the use of the disclosed compounds as slimicides is not restricted to the paper-making industry, but rather encompasses the use of these compounds in industrial waters broadly with particular emphasis upon recirculating industrial waters.

Slime in pulp and paper systems presents a number of serious problems to the paper manufacturer. For example, it prevents normal flow of stock suspensions by clogging felts, wires, and screens. In addition it may become incorporated in the paper sheet, thus reducing its strength and resulting in a product having unsightly spots and holes.

In order to be useful as a slimicide, a material must be rapidly effective against a broad spectrum of microorganisms comprising bacteria, fungi, and algae. It must also persist in the system and retain its effectiveness for a prolonged period of time. In addition it should not cause corrosion or deterioration of metal parts of the equipment being used. It should be non-toxic, and it should not impart color, odor, or taste to the water or to the paper.

In accordance with the present invention, it has been found that the growth of slime-forming microorganisms in industrial water systems can be controlled by treating the system with a compound have the structure

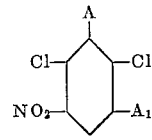

wherein A represents a member selected from the group consisting of —$(CH_2)_n$COOR, —CHO, —CN, —CH:NOH, and —CH:CHCOOR; $A_1$ represents a member selected from the group consisting of —H and —Cl; $n$ represents an integer in the range of 0 to 2; R represents a member selected from the group consisting of —H, —Na, —K, —$NH(R_1)_3$, and lower alkyl groups; and $R_1$ represents a member selected from the group consisting of —H, lower alkyl groups, and lower alkanol groups. Illustrative of these compounds are 2,3,6-trichloro-5-nitrobenzoic acid; 2,3,6-trichloro-5-nitrophenylacetic acid; 2,3,6-trichloro-5-nitrophenylpropionic acid; 2,6-dichloro-3-nitrobenzoic acid; 2,6-dichloro-3-nitrophenylacetic acid; 2,3,6-trichloro-5-nitrocinnamic acid; the sodium, potassium, ammonium, monomethylammonium, monoethylammonium, monobutylammonium, dimethylammonium, diethylammonium, dibutylammonium, trimethylammonium, tributylammonium, monoethanolammonium, diethanolammonium, and triethanolammonium salts of the aforementioned acids; the methyl, ethyl, propyl, and butyl esters of the aforementioned acids; 2,3,6-trichloro-5-nitrobenzaldehyde; 2,3,6-trichloro-5-nitrobenzaldoxime, and 2,3,6-trichloro-5-nitrobenzonitrile. The most effective of these compounds as slime-control agents are 2,3,6-trichloro-5-nitrobenzoic acid, 2,3,6-trichloro-5-nitrophenylacetic acid, 2,3,6-trichloro-5-nitrophenylpropionic acid, and the water-soluble salts of these acids. If desired, a mixture of two or more of these compounds or mixtures of these compounds and their relatively inactive isomers may be used.

While the slimicidal compounds may be used as such in the process of this invention, they are usually and preferably used in combination with an inert carrier that facilitates the dispensing of dosage quantities of the slimicide and assists in its rapid dispersion throughout the system. The slimicidal compounds may be mixed with or deposited upon inert particulate solids, such as fullers earth, talc, diatomaceous earth, hydrated calcium silicate, kaolin, and the like, to form dry particulate compositions. They are preferably dispensed in the form of solutions or dispersions in inert organic solvents or in mixtures of inert organic solvents and water. Such compositions generally contain approximately 5% to 80% by weight and preferably 10% to 50% of the active material. The solvents that may be used in the preparation of these compositions include both polar and non-polar aliphatic and aromatic solvents, for example, benzene, toluene, xylene, naphtha, nitrobenzene, dimethylformamide, carbon tetrachloride, acetone, acetic acid, methanol, ethanol, dioxane, mineral spirits and mixtures thereof.

To assist in their rapid and complete dispersion in the water system, the compositions may contain approximately 5% to 30% by weight and preferably 10% to 20% by weight of an anionic or nonionic surface-active agent. Suitable surface-active agents include sodium dialkyl sulfosuccinites, sodium alkyl sulfates, sodium aryl sulfonates, sorbitan esters of fatty acids, and fatty acid esters of polyhydric alcohols. The compositions may also contain water in the amount of approximately 5% to 75% and preferably 20% to 50% by weight.

In the practice of the present process for the control of slime in paper-making operations, a composition containing at least one of the aforementioned compounds is added to the pulp or furnish and circulating waters associated therewith in an amount sufficient to control the growth of the microorganisms. As little as 0.005 pound of the active compound may be added per ton of dry paper produced to inhibit slime formation. When severe slime conditions are encountered, five pounds or more or the slimicide per ton of dry paper produced may be required to achieve satisfactory slime control. In most cases approximately 0.05 pound to 1 pound of the slimicide is added per ton of dry paper produced. The composition may be added at any of the units or machines used in the process with the choice in each case dependent upon such factors as the process employed, the type of paper being produced, etc. It is preferably added at the site or sites of greatest slime accumulation, which is usually at or near the paper-making machine. The remainder of the system, which is generally fed with considerable amounts of recirculating white water, should contain a sufficient amount of the slimicidal compound to inhibit slime formation and growth.

The active compounds of the present invention may be used as the sole slime-control agent in an industrial water system, or they may be used in combination with one or more other slime-control agents.

This invention is further illustrated by the examples that follow. It is to be understood, however, that these examples are given solely for the purpose of illustration and that the invention is not to be regarded as limited to any of the specific materials or conditions recited therein except as set forth in the appended claims.

Example 1

The effectiveness of the slimicidal compounds of this invention in the control of slime-forming microorganisms was demonstrated by carrying out pulp-substrate tests using pure cultures of bacteria that are representative of those ordinarily found in paper mill slime.

The tests were carried out by adding the compounds as a 1% solution in methanol in an amount of 40 p.p.m. to flasks containing 70 ml. of a 0.3% aqueous bleached sulfite pulp suspension previously adjusted to pH 5.5 with alum. Each flask was then inoculated with a standardized bacterial culture. The flasks were placed on a reciprocating shake machine and allowed to incubate at 37° C. for periods ranging from 1 to 5 hours. After each incubation period, a portion of the pulp culture was withdrawn, diluted, and plated on a nutrient agar plate. Quantitative bacterial counts were then made. The results obtained are given in Table I.

TABLE I

| Slime-Control Agent | Average count (in thousands)/ml./Contact time | | | | | |
|---|---|---|---|---|---|---|
| | Aerobacter aerogenes | | | Flavobacterium flavescens | | |
| | 1 Hr. | 3 Hrs. | 5 Hrs. | 1 Hr. | 3 Hrs. | 5 Hrs. |
| 2,3,6-trichloro-5-nitrobenzoic acid | 0.07 | 0.01 | 0.01 | 0.01 | 0.01 | 0.01 |
| 2,3,6-tichloro-5-nitrophenylacetic acid | 0.01 | 0.01 | 0.01 | 0.14 | 0.01 | 0.01 |
| 2,3,6-trichloro-5-nitrophenylpropionic acid | 0.01 | 0.8 | 0.4 | 0.02 | 0.03 | 0.03 |
| 2,3,6-trichloro-5-nitrocinnamic acid | 0.1 | 0.03 | 0.05 | 0.2 | 0.2 | 0.2 |
| 2,6-dichloro-3-nitrobenzoic acid | 0.8 | 0.3 | 0.5 | 0.4 | 0.5 | 0.4 |
| 2,3,6-trichloro-5-nitrobenzaldehyde | 0.5 | 0.4 | 0.4 | 0.03 | 0.2 | 0.1 |
| 2,3,6-trichloro-5-nitrobenzaldoxime | 8.5 | 6.0 | 9.1 | 120 | 8.5 | 6.0 |
| 2,3,6-trichloro-5-nitrobenzonitrile | 125 | 120 | 115 | 8.0 | 6.0 | 6.0 |
| None | 270 | 272 | 265 | 300 | 300 | 300 |

Example 2

The effectiveness of the slimicidal compounds of this invention in the control of a representative group of slime-forming bacteria, fungi, and algae was demonstrated by means of the Standard Agar Plate Assay Disc Procedure.

Each of the slimicidal compounds was evaluated at the levels of 1% and 2%. A solution of 2,3,6-trichloro-5-nitrobenzaldehyde in benzene and solutions of the other compounds in methanol were used the tests.

A summary of the results of the tests is given in Table II. In this table the activity of the compounds against the test organisms is expressed by means of the following symbols:

NZO—No zone of inhibition
ZO—Zone of inhibition in mm.
G—Growth in zone
S—Secondary zone. Growth without sporulation around assay disc
R—Zone of reduced growth, sporulation within

TABLE II

| Slime-Control Agent | Level Tested, Percent | Fungi (7 days incubation) | | | Bacteria (48 Hours Incubation) | | | | Algae (7 days incubation) |
|---|---|---|---|---|---|---|---|---|---|
| | | A. niger | P. crustosum | P. pullulans | S. aureus | E. flavescens | A. aerogenes | X. vesicatoria | C. vulgaris |
| 2,3,6-trichloro-5-nitrobenzoic acid | 1 | SZO 2 | SZO 2 | SZO 3 | NZO | NZO | NZO | ZO 2 | ZO 1 |
| | 2 | SZO 3 | SZO 2 | ZO 2 | ZO 1 | ZO 1 | ZO 2 | ZO 2 | ZO 2 |
| 2,3,6-trichloro-5-nitrophenylacetic acid | 1 | SZO 2 | SZO 2 | SZO 3 | ZO 6 | ZO 8 | ZO 10 | ZO 2 | ZO 4 |
| | 2 | SZO 3 | ZO 1 | ZO 2 | ZO 7 | ZO 8 | ZO 4 | ZO 2 | ZO 5 |
| 2,3,6-trichloro-5-nitrophenylpropionic acid | 1 | ZO 1 | ZO 4 | ZO 3 | ZO 6 | ZO 5 | NZO | ZO 2 | ZO 5 |
| | 2 | ZO 2 | ZO 5 | ZO 3 | ZO 8 | ZO 6 | ZO 2 | ZO 2 | ZO 6 |
| 2,3,6-trichloro-5-nitrocinnamic acid | 1 | SZO 0.5 | ZO 0.5 | ZO 2 | ZO 8 | ZO 4 | NZO | NZO | ZO 4 |
| | 2 | SZO 0.5 | ZO 1 | ZO 5 | ZO 8 | ZO 9 | ZO 1 | NZO | ZO 5 |
| 2,3,6-trichloro-5-nitrobenzonitrile | 1 | ZO 9 | ZO 9 | SZO 12 | ZO 6 | ZO 4 | NZO | ZO2 | ZO 6 |
| | 2 | ZO 10 | ZO 10 | SZO 12 | ZO 7 | ZO 4 | NZO | ZO 2 | ZO 6 |
| 2,3,6-trichloro-5-nitrobenzaldehyde | 1 | SZO 1 | ZO 1 | SZO 1 | NZO | ZO 2 | ZO 0.5 | NZO | NZO |
| | 2 | SZO 2 | ZO 2 | ZO 1 | NZO | ZO 2 | ZO 0.5 | NZO | NZO |
| 2,3,6-trichloro-5-nitrobenzaldoxime | 1 | SZO 1 | ZO 3 | ZO 2 | ZO 2G | ZO 3G | ZO 2G | ZO 3 | ZO 5 |
| | 2 | SZO 2 | ZO 6 | ZO 3 | ZO 2G | ZO 3G | ZO 3G | ZO 3 | ZO 6 |
| 2,6-dichloro-3-nitrobenzoic acid | 1 | ZOR 1 | SZO 1 | SZO 2 | NZO | NZO | NZO | ZO 3 | ZO 2 |
| | 2 | ZOR 1 | SZO 2 | SZO 2 | NZO | NZO | NZO | ZO 3 | ZO 3 |
| None | | NZOG | NZOG | ZOR 1 | NZO | NZO | NZO | NZO | NZO |

From the data in Table II, it will be seen that all of the chloronitro compounds show appreciable activity as bactericides, fungicides, and algicides. Each of these compounds can be used to control the growth of slime-forming microorganisms in industrial water systems.

Example 3

2,3,6-trichloro-5-nitrobenzoic acid was evaluated as a slimicide by the procedure described in Example 1 using 10 ml. of 0.3% aqueous Canadian wood pulp suspension and 60 ml. of 0.3% aqueous bleached sulfite pulp suspension as substrate. The results are summarized in Table III.

TABLE III

| Slime-Control Agent | Average count (in thousands)/ml./Contact Time | | |
|---|---|---|---|
|  | 1 Hour | 3 Hours | 5 Hours |
| 2,3,6-trichloro-5-nitrobenzoic acid | 0 | 5 | 0 |
| None | 125 | 144 | 124 |

From these data it will be seen that 2,3,6-trichloro-5-nitrobenzoic acid effectively controlled the growth of the natural flora found in the Canadian wood pulp.

What is claimed is:

1. The process of inhibiting microbiological deterioration of organic substances that are normally susceptible to deterioration by the action of microorganisms and inhibiting the formation of slime in industrial water systems that are in contact with such substances which comprises adding to the water system a microbiocidally effective amount of 2,3,6-trichloro-5-nitrophenylacetic acid.

2. The process of inhibiting microbiological deterioration of organic substances that are normally susceptible to deterioration by the action of microorganisms and inhibiting the formation of slime in industrial water systems that are in contact with such substances which comprises adding to the water system a microbiocidally effective amount of 2,3,6-trichloro-5-nitrophenylpropionic acid.

3. The process of inhibiting microbiological deterioration of organic substances that are normally susceptible to deterioration by the action of microorganisms and inhibiting the formation of slime in industrial water systems that are in contact with such substances which comprises adding to the water system a microbiocidally effective amount of 2,3,6-trichlor-5-nitrobenzaldehyde.

4. The process of inhibiting microbiological deterioration of organic substances that are normally susceptible to deterioration by the action of microorganisms and inhibiting the formation of slime in industrial water systems that are in contact with such substances which comprises adding to the water system a microbiocidally effective amount of 2,3,6-trichloro-5-nitrocinnamic acid.

5. The process of inhibiting the formation and growth of slime in a paper mill water system comprising an aqueous dispersion of paper-making fibers which comprises introducing into the system approximately 0.05 pound to 1 pound of 2,3,6-trichloro-5-nitrophenylacetic acid for each ton of paper produced.

6. The process of inhibiting the formation and growth of slime in a paper mill water system comprising an aqueous dispersion of paper-making fibers which comprises introducing into the system approximately 0.05 pound to 1 pound of 2,3,6-trichloro-5-nitrophenylpropionic acid for each ton of paper produced.

7. The process of inhibiting the formation and growth of slime in a paper mill water system comprising an aqueous dispersion of paper-making fibers which comprises introducing into the system approximately 0.05 pound to 1 pound of 2,3,6-trichloro-5-nitrocinnamic acid for each ton of paper produced.

8. The process of inhibiting the formation and growth of slime in a paper mill water system comprising an aqueous dispersion of paper-making fibers which comprises introducing into the system approximately 0.05 pound to 1 pound of 2,3,6-trichloro-5-nitrocinnamic acid for each ton of paper produced.

9. An aqueous suspension of cellulosic pulp intended for use in the production of paper which is normally susceptible to microbiological deterioration and slime formation and which contains for the purpose of inhibiting such deterioration and slime formation approximately 0.05 pound to 1 pound per ton of dry pulp of 2,3,6-trichloro-5-nitrophenylacetic acid.

10. An aqueous suspension of cellulosic pulp intended for use in the production of paper which is normally susceptible to microbiological deterioration and slime formation and which contains for the purpose of inhibiting such deterioration and slime formation approximately 0.05 pound to 1 pound per ton of dry pulp of 2,3,6-trichloro-5-nitrophenylpropionic acid.

11. An aqueous suspension of cellulosic pulp intended for use in the production of paper which is normally susceptible to microbiological deterioration and slime formation and which contains for the purpose of inhibiting such deterioration and slime formation approximately 0.05 pound to 1 pound per ton of dry pulp of 2,3,6-trichloro-5-nitrobenzaldehyde.

12. An aqueous suspension of cellulosic pulp intended for use in the production of paper which is normally susceptible to microbiological deterioration and slime formation and which contains for the purpose of inhibiting such deterioration and slime formation approximately 0.05 pound to 1 pound per ton of dry pulp of 2,3,6-trichloro-5-nitrocinnamic acid.

References Cited

UNITED STATES PATENTS

| 2,841,522 | 7/1958 | Wolf | 167—30 |
| 2,901,394 | 8/1959 | Rosher | 162—161 X |

FOREIGN PATENTS 247,678    10/1963    Australia.

OTHER REFERENCES

Chemical Abstracts, vol. 46, Oct.–Nov., 1952, p. 9166c.

S. LEON BASHORE, *Primary Examiner.*